United States Patent [19]
Rueth et al.

[11] Patent Number: 5,228,054
[45] Date of Patent: Jul. 13, 1993

[54] POWER-OF-TWO LENGTH PSEUDO-NOISE SEQUENCE GENERATOR WITH FAST OFFSET ADJUSTMENT

[75] Inventors: Timothy I. Rueth, Cardiff-by-the-Sea; Lindsay A. Weaver, Jr., San Diego, both of Calif.; Klein S. Gilhousen, Bozeman, Mont.

[73] Assignee: QUALCOMM Incorporated, San Diego, Calif.

[21] Appl. No.: 862,687

[22] Filed: Apr. 3, 1992

[51] Int. Cl.[5] .............................. H04L 9/00
[52] U.S. Cl. .......................... 375/1; 380/49; 380/28; 380/33
[58] Field of Search .............. 375/1, 37, 59, 68; 380/28, 33, 34, 49; 370/18, 19, 21, 22; 379/59; 455/33, 54

[56] References Cited

U.S. PATENT DOCUMENTS

| | | |
|---|---|---|
| 4,776,012 | 10/1988 | Zscheile, Jr. et al. .............. 380/46 |
| 4,785,410 | 11/1988 | Hamatsu et al. .................. 364/717 |
| 4,864,525 | 9/1989 | Kurihara et al. .................. 364/717 |
| 4,866,735 | 9/1989 | Mori et al. ........................ 375/1 |
| 5,103,459 | 4/1992 | Gilhousen et al. ................ 375/1 |

Primary Examiner—David Cain
Attorney, Agent, or Firm—Russell B. Miller

[57] ABSTRACT

A maximal length linear sequence pseudorandom noise (PN) sequence generator for generating an augmented length PN sequence of length $2^N$. The PN generator includes circuitry for generating a PN sequence of length $2^N - 1$ chips. A sequence augmenting circuit is included which inserts at least one additional chip in the PN sequence at a predetermined position within the PN sequence so as to provide an output of an augmented PN sequence of length $2^N$ chips. The generator may also include sequence shifting circuitry which is responsive to a mask input for providing a predetermined shift in the output augmented PN sequence without incurring a transition period where the shifted output is invalid.

18 Claims, 4 Drawing Sheets

POWER-OF-TWO LENGTH PSEUDO-NOISE SEQUENCE GENERATOR WITH FAST OFFSET ADJUSTMENT

BACKGROUND OF THE INVENTION

I. Field of the Invention

The present invention relates to the field of communications. More particularly, the present invention relates to a novel and improved pseudorandom noise (PN) generator for generating a PN code sequence capable of being used for direct sequence spreading of a communication signal in a spread spectrum communication system.

II. Description of the Related Art

Pseudo-noise or pseudorandom noise generators are commonly used for bandwidth spreading of a digital signal in a direct sequence spread spectrum communication system. In such systems, such as a Code Division Multiple Access (CDMA) system, the PN sequence is commonly generated by a Linear Sequence Shift Register (LSSR).

The LSSR is comprised of an N-stage shift register, with some intervening exclusive-OR gates to program a specific PN sequence. The location of the exclusive-OR gates is determined by the defining polynomial of the circuit which in turn, determines which one of the possible sequences will be generated. There are a total of $2^{(N-1)}-1$ polynomials for a generator of length N. Only a fraction, about 10%, produce a "maximal" length sequence. A "maximal" length sequence is of length $2^N-1$.

For example, a generator with 15 stages and a maximal polynomial will produce a sequence that is 32,767 bits (or "chips") long. In this example, the sequence will contain a single run of 15 ones in a row, and a single run of 14 zeroes in a row. All other runs of ones and zeroes are shorter in length. Every maximal length sequence generator with N stages produces a single run of N ones in a row and a single run of N−1 zeroes in a row.

In many practical applications of PN sequence generators, a sequence length of $2^N-1$ is inconvenient because these numbers contain few factors and are frequently prime numbers. This makes it difficult to synchronize a system which contains processes operating at a lower rate than the PN chip rate.

In a practical example, a PN sequence rate of 1.2288 MHz is desired along with a data modulation rate of 9600 bits per second. The information bits are exclusive-ORed with the PN sequence and the result is bi-phase modulated onto an RF carrier for transmission. This provides 128 PN "chips" per information bit. In another mode of operation, the PN rate would remain the same but the data rate would be reduced to 4800 bits per second or 256 PN "chips" per information bit. It would be desirable to synchronize the data modulation to the PN sequence repetition. However, if the sequence is of length 32767, i.e. $2^{15}-1$, which has only the factors 7, 31 and 151, then the repetition interval of the PN code and the above two data rates will only coincide every 128 or 256 repetition intervals of the PN sequence. This coincidence occurs only every 3.4 or 6.8 seconds, respectively.

It can be seen from the above that it would be highly desirable for the length of the PN sequence to be a power of two to permit a greater frequency of coincidence in repetition interval of the PN code for multiple data rates. Besides allowing a multiplicity of different data rate modes sharing a common PN chip rate, information bits may be synchronized as soon as the PN sequence synchronization is obtained, thus greatly simplifying the operation of the receiver. In the above example, if the PN sequence is increased to 32768, then whenever the sequence repeats, the synchronization of the 4800 or 9600 bps modulation also repeats. Therefore, as soon as the PN sequence is synchronized, which must necessarily come first anyway, the data modulation circuitry is automatically also in synchronization.

It is therefore an object of the present invention to provide a novel and improved PN sequence generator which generates a PN sequence that is a power of two in length.

It is another object of the present invention to provide a PN generator that permits a selectable phase offset to the PN sequence wherein a change in phase offset selection immediately affects the phase offset output.

SUMMARY OF THE INVENTION

The present invention is a novel and improved apparatus and method for generating PN sequences. The PN generator of the present invention is capable of increasing the length of a maximal length linear PN sequence generator generated sequence ($2^N-1$ sequence length) by one PN chip so as to provide a PN sequence that is a power of two ($2^N$ sequence length). The PN generator of the present invention also provides a simple mechanism for producing the desired PN sequence when combined with a mechanism for providing an easily adjustable phase offset or time shift in the PN sequence. This type of PN sequence is extremely useful when time offsets of the basic PN sequence are used for addressing purposes in a Code Division Multiple Access (CDMA) communication system.

In accordance with the present invention a maximal length linear sequence pseudorandom noise (PN) sequence generator is disclosed which is capable of generating an augmented length PN sequence of length $2^N$. The PN generator includes circuitry such as the LSSR for generating a PN sequence of length $2^N-1$ chips. A sequence augmenting circuit is included which inserts at least one additional chip in the PN sequence at a predetermined position within the PN sequence. The sequence augmenting circuit thus provides as an output an augmented PN sequence of length $2^N$ chips. The generator may also include sequence shifting circuitry which is responsive to a shift input for providing a predetermined shift in the output augmented PN sequence.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
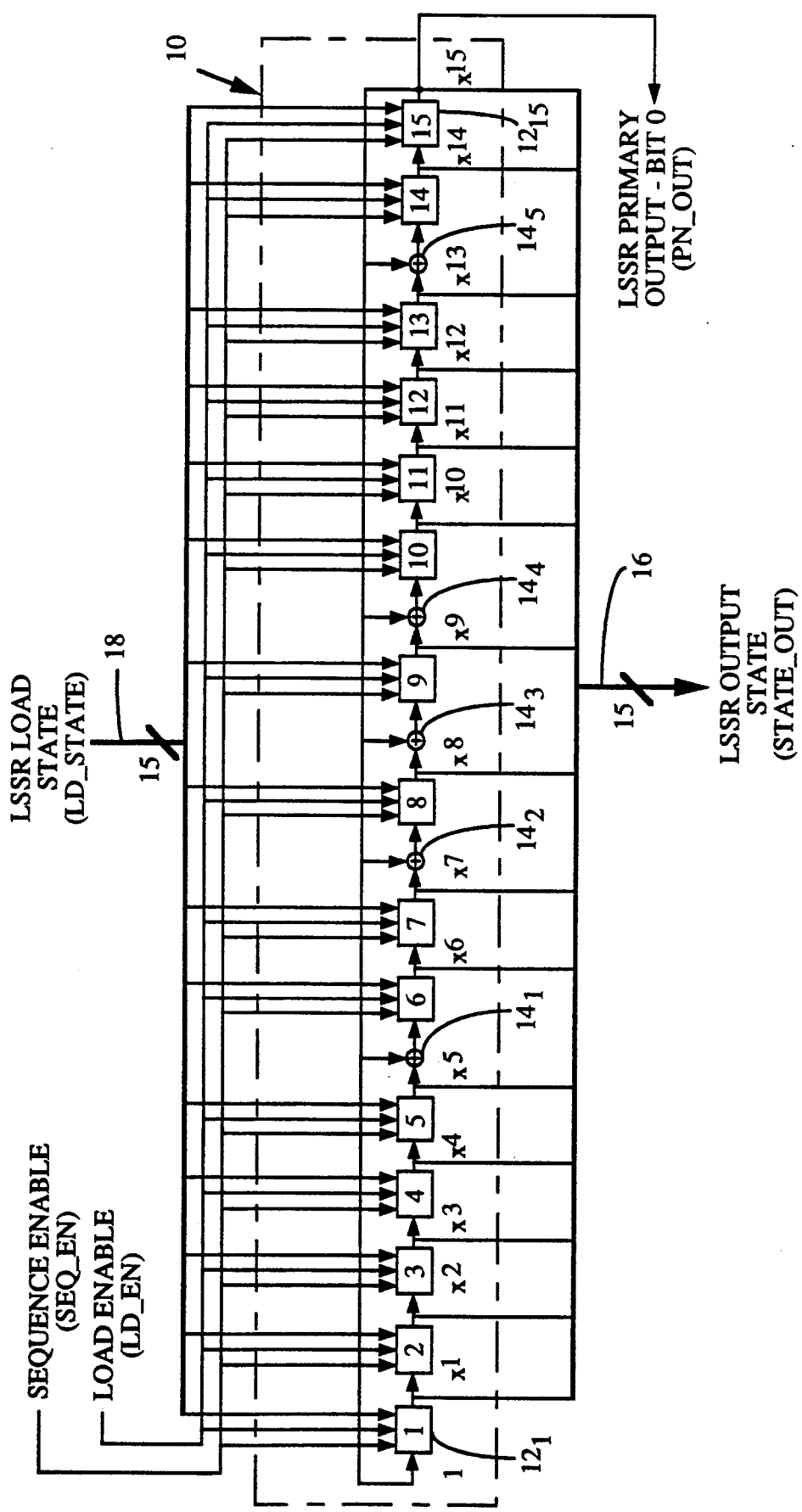
FIG. 1 is a circuit diagram of a PN sequence generator in the form of a linear sequence shift register with parallel load input.

Referring now to FIG. 1, an exemplary Linear Sequence Shift Register (LSSR) PN generator 10 is illustrated. LSSR 10 as illustrated in FIG. 1 is a 15 stage LSSR capable of generating a PN sequence of length $2^N-1$, where N=15 such that the $2^{15}-1=32767$. As illustrated in FIG. 1 LSSR 10 is configured to produce a PN sequence according to the polynomial of equation 1:

$$PN = x^{15} + x^{13} + x^9 + x^8 + x^7 + x^5 + 1 \quad (1)$$

LSSR 10 is comprised of a sequence of storage elements or shift register stages 12 coupled in series with exclusive OR gates or modulo-2 adders 14 disposed between the shift register stages as defined by equation 1. In implementing the polynomial of equation 1 the output of stages $12_1-12_4$ are respectively coupled to an input of stages $12_2-12_5$; the output of stage $12_6$ is coupled to an input of stage $12_7$, the output of stages $12_{10}-12_{12}$ are respectively coupled to an input of stages $12_{11}-12_{13}$; the output of stage $12_{14}$ is coupled to an input of stage $12_{15}$. Furthermore the output of stages $12_5$, $12_7-12_9$ and $12_{13}$ are respectively coupled to one input of adders $14_1-14_5$ with the outputs adders $14_1-14_5$ respectively coupled to the input of stages $12_6$, $12_8-12_{10}$ and $12_{14}$. The output of stage $12_{15}$, the primary output of LSSR 10 (LSSR bit 0) is fed back as an input of stage $12_1$ and the other input of each of adders $14_1-14_5$. The output state of each stage $12_1-12_{15}$, respectively the values $x^1-x^{15}$, is provided on a 15-bit output bus 16 as the signal STATE_OUT.

Each stage $12_1-12_{15}$ has another input similarly coupled to a 15-bit input bus 18 used to load or initialize LSSR 10. Each bit of the 15-bit value provided on bus 18 is loaded into a corresponding one of stages $12_1-12_{15}$ when each stage receives at another input a load enable signal (LD_EN).

The bit stored in each stage is shifted out of the stage in response to a system clock (not shown). The bit output from each stage is provided on bus 16 and as an input to a next stage or an adder, with the output from the adder provided to the next stage. In response to a sequence enable signal (SEQ_EN) signal input to each stage, the shifting of the data in the stages at each clocking is enabled.

In a general LSSR, the primary output bit from each clocking of the LSSR is used as a PN sequence bit. The primary output bit clocked PN sequence may be lengthened to a $2^N$ length using a sequence lengthening circuit disclosed herein. Furthermore the lengthening circuit may be used in combination with a mask circuit which permits a fast phase offset adjustment in the PN sequence. On the other hand, the mask circuit may be used independent of the sequence lengthening circuit with the LSSR to provide a shift in the PN sequence of length $2^N-1$.

Figure 2:
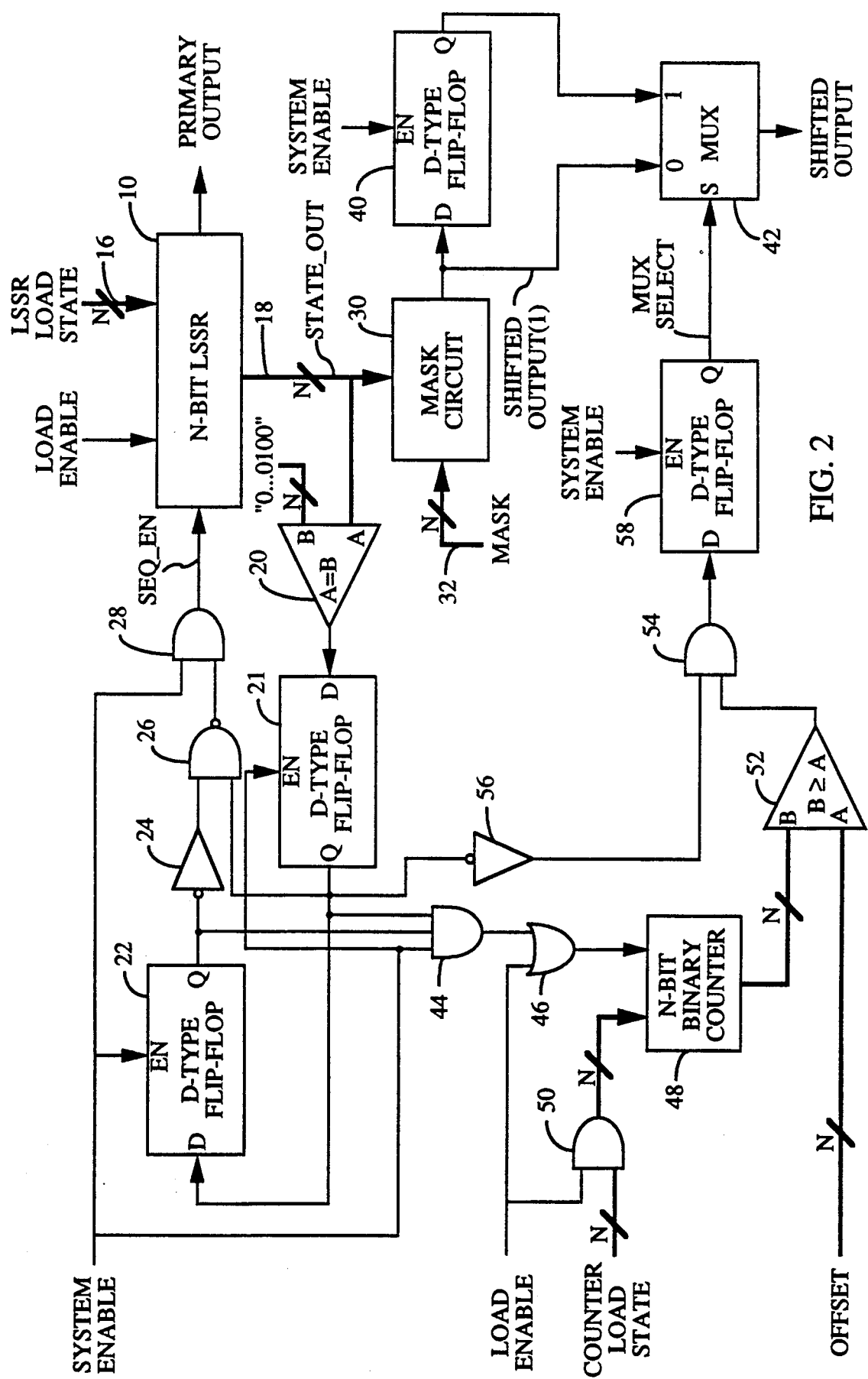
FIG. 2 is an exemplary circuit diagram of the PN sequence generator of the present invention.

Referring to FIG. 2, the mask circuit and the sequence lengthening circuit, comprised of several D-type flip-flops, a comparator, a binary counter, a multiplexer, and some random logic, are illustrated along with LSSR 10. The inputs to the circuitry of FIG. 2 include a SYSTEM CLOCK (not shown) which clocks the LSSR, flip-flops, and binary counter; a SYSTEM ENABLE which enables or disables the sequencing of the entire circuit; and a LOAD ENABLE which allows the state of the LSSR and the binary counter to be loaded. Input busses include the LSSR LOAD STATE; a binary COUNTER LOAD STATE; a MASK bus, which is used to determine the amount the shifted sequence output is shifted from the primary sequence output; and an OFFSET bus, which is used to determine when an extra state should be inserted in the shifted sequence. All of these busses are N bits wide. The circuit outputs include the PRIMARY OUTPUT, which is the last bit in the LSSR (right-most bit in a right-shifted LSSR which is also used as the feedback); and the SHIFTED OUTPUT, which forms a sequence which is phase-shifted from that of the PRIMARY OUTPUT. Both of the PRIMARY OUTPUT and SHIFTED OUTPUT sequences are of length $2^N$.

In FIG. 2, the sequence lengthening circuit used in conjunction with LSSR 10 consists of N-bit comparator 20, D type flip-flops 21 and 22, inverter 24, NAND gate 26 and AND gate 28. The LSSR OUTPUT STATE bus (STATE_OUT) 18 is coupled to an A input of comparator 20 while the B input thereof receives a fixed N-bit value. The output of comparator 20 is coupled to the D input of flip-flop 21 with the Q output thereof coupled to the D input of flip-flop 22. Flip-flops 21 and 22 each also receiving the system enable signal at an enable input thereof. The Q output of flip-flop 22 is coupled to the input of inverter 24 with the output thereof coupled as one input of NAND gate 26. The other input of NAND gate 26 is coupled to the output of flip-flip 21. The output of NAND gate 26 is coupled to one input of AND gate 28 with the other input thereof receiving the SYSTEM ENABLE signal. The output of AND gate 28 is coupled to LSSR 10 for providing the signal SEQ_EN thereto.

The sequence is lengthened by adding a zero to the single run containing N−1 zeroes in a row in the sequence. This lengthening results in a sequence that contains an equal number of zeroes and ones. More specifically the sequence which contains one run of N "1's" now also contains one run of N "0's". Referring to the circuit diagram of FIG. 2, the N-bit LSSR state output on bus 18 is compared in comparator 20 with the value "0 . . . 0100," where bit N2, i.e. the third least significant bit, contains a "1" and all other bit locations contain zeroes. When this state is detected, a "1" is latched in flip-flop 21. The following state, the LSSR state of "0 . . . 0010," is allowed to occur, but then sequencing of LSSR 10 is inhibited for one cycle by the signal SEQ_EN. Therefore, the "0 . . . 0010" state is present for two cycles, effectively inserting an additional zero in the run of N−1 zeroes of the PRIMARY OUTPUT sequence (PN_OUT).

It hsould be understood that the value "0 . . . 0010" used in the above example for comparison with the LSSR state provides the insertion at the end of the next clock cycle due to the particular logic implementation. Other comparison states may be desirable to insert the additional chip or chips at other LSSR state or states.

It should also be understood that the use of flip-flop 21 latches a comparison of the LSSR state with the "0 . . . 0100" comparison state. In an alternative implementation a comparison could be accomplished in which flip-flop 21 would not be used and the output of comparator 20 is provided to the D input of flip-flop 22. The comparison value for the LSSR state input to comparator 20 would be "0 . . . 0010" rather than "0 . . . 0100".

Upon detection of the "0 . . . 0010" state, at the next clocking of flip-flop 22, the LSSR would be inhibited from changing state for one clock cycle.

It is also desirable in certain instances to provide a phase shifted version of the PRIMARY OUTPUT, a SHIFTED OUTPUT, for either of a $2^N-1$ or $2^N$ length generated PN sequence. The SHIFTED OUTPUT is generated by modulo-2 addition, i.e. such as by exclusive-ORing, of a specified set of LSSR bits. According to the shift-and-add property of the LSSR, any phase shift of a PN sequence can be produced by modulo-2 addition of the proper stages of the LSSR. In order to provide the shift an N-bit MASK is ANDed with the LSSR state to select the bits to be exclusive-ORed. The use of the N-bit MASK can be set to provide any one of the $2^N-2$ or $2^N-1$ different shifts of the basic sequence. The MASK input bus is set to a predetermined value so as to result in the desired phase shift of the second output.

As illustrated in FIG. 2 the N-bit STATE_OUT values from LSSR 10 are provided on bus 18 as an input to mask circuit 30. Mask circuitry 30 also receives the N-bit mask value on bus 32. From these values mask circuit 30 generates a shifted version of the PRIMARY OUTPUT as the signal SHIFTED OUTPUT(1) for maximal length sequences of length $2^N-1$. However for a maximal linear sequence that has been lengthened by one bit additional correction circuitry must be used to provide the correct shifted $2^N$ sequence.

Figure 3:
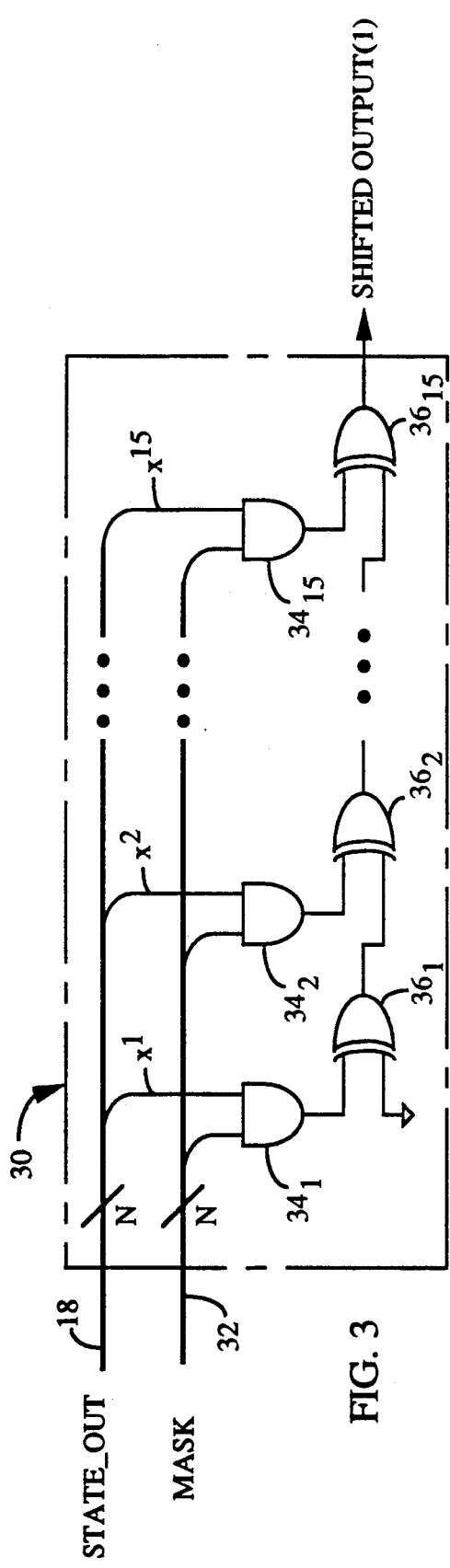
FIG. 3 is an exemplary circuit diagram of the mask circuit of FIG. 2.

FIG. 3 illustrates in further detail an exemplary implementation of mask circuit 30 as used in conjunction with LSSR 10 as previously discussed. In FIG. 3, a sequence of AND gates $34_1$-$34_{15}$ each have one input for receiving a different bit from bus 18. For example AND gates $34_1$-$34_{15}$ respectively receive from bus 18 the bits $x^1$-$x^{15}$, also referred to as bit $N-1$ through bit 0. The other input of each of AND gates $34_1$-$34_{15}$ receive from bus 32 a corresponding mask bit $N-1$ through mask bit 0. The output of each of AND gates $34_1$-$34_{15}$ is coupled to one input of a respective one a cascaded sequence of exclusive-OR gates $36_1$-$36_{15}$. In this sequence the first exclusive-OR gate $36_1$ has one input coupled to the output of AND gate $34_1$, another input coupled to ground (a logical "0") with the output coupled to the other input of exclusive-OR gate $36_2$. At the output of exclusive-OR gate $36_{15}$ is provided the SHIFTED OUTPUT(1) sequence.

As mentioned previously, the shift-and-add property does not work correctly for a maximal linear sequence that has been lengthened by one bit. The above described masked and exclusive-ORed bits must be adjusted for the extra bit in the sequence. In the present invention, this adjustment is accomplished by passing the SHIFTED OUTPUT(1) sequence through a variable time delay consisting of a zero delay or a one bit time delay. This one bit time delay is provided by clocking the SHIFTED OUTPUT(1) sequence through a flip-flop.

During the first part of the sequence, the final output sequence, i.e. SHIFTED OUTPUT sequence, is taken from the mask circuit following the masking operation (zero time delay). Thus during the zero time delay period the final SHIFTED OUTPUT sequence is the same as the SHIFTED OUTPUT(1) sequence. However, when the SHIFTED OUTPUT(1) sequence output from the mask circuit reaches the point where the run of $N-1$ zeroes is passing through the mask circuit, the SHIFTED OUTPUT is provided from the output of the flip-flop. Thus the SHIFTED OUTPUT sequence is the SHIFTED OUTPUT(1) sequence delayed by one bit time so as to add an extra zero in the shifted sequence. When the LSSR reaches the state where it is inhibited for a clock cycle, the SHIFTED OUTPUT is switched back to the output of the mask circuit which is the SHIFTED OUTPUT(1) sequence. This action prevents an extra bit from being inserted in this part of the sequence.

In order to achieve the above a correction circuit is provided. The correction circuit includes D-type flip-flop 40 having a D input coupled to the output of mask circuit 30 for receiving the SHIFTED OUTPUT(1) sequence. Flip-flop 40 also includes an enable input which receives the SEQ_EN signal. The delayed version of the SHIFTED OUTPUT(1) sequence is output at the Q output of flip-flop 40 as one input to 2:1 multiplexer 42. The other input of multiplexer 42 is coupled to the output of mask circuit 30 for receiving the zero shifted version of the SHIFTED OUTPUT(1) sequence. Multiplexer 42 in response to a MUX SELECT signal, provided at a select input thereof, selects between the zero shifted version of the SHIFTED OUTPUT(1) sequence and the shifted version of the SHIFTED OUTPUT(1) sequence for providing at the output thereof as the SHIFTED OUTPUT sequence.

In generating the MUX SELECT signal, AND gate 44 has one input coupled to the output of flip-flop 21, another coupled to the output of flip-flop 22, and the last input for receiving the SYSTEM ENABLE signal. The output of AND gate 44 is coupled to one input of OR gate 46 with the other input thereto receiving the LOAD ENABLE signal. The output of OR gate 46 is coupled as a counter load enable signal to an enable input of N-bit binary counter 48. Counter 48 also receives an N-bit COUNTER LOAD STATE signal through AND gate 50 which provides the COUNTER LOAD STATE signal in response to the LOAD ENABLE signal which is also an input to AND gate 50. Although AND gate 50 is illustrated as a single AND gate it should be understood that it represents a series of AND gates each receiving at one input a different bit of the N-bit COUNTER LOAD STATE signal with the other receiving the LOAD ENABLE signal. The output of each of these AND gates is provided to a respective one of N load inputs of counter 48.

The N-bit output of counter 48 is provided to the B input of N-bit comparator 52, while at the A input is provided an N-bit offset value. Comparator 52 determines whether the input provided at the B input is greater than or equal to the A input. The output of comparator 52 is coupled to one input of AND gate 54. The other input of AND gate 54 is the inverted output of flip-flop 21 provided through inverter 56. The output of AND gate 54 is provided to the D input of D-type flip-flop 58 with the enable input receiving the SYSTEM ENABLE signal. The Q output of flip-flop 58 is coupled to the select input of multiplexer 42 for providing the MUX SELECT signal thereto.

The determination of when to insert an extra zero in the SHIFTED OUTPUT sequence, and when to prevent an unwanted extra state in the SHIFTED OUTPUT sequence when one is being inserted in the PRIMARY OUTPUT, is supported by the operation of N-bit binary counter 48 and comparator 52. Recalling that the LSSR state "0 . . . 0010" is present for two cycles, it is the second of these two cycles which causes the extra zero to be inserted in the primary sequence. This cycle also causes counter 48 to be reset to zero.

The signal provided on an N-bit OFFSET bus to comparator 52 must be set to the amount of the desired SHIFTED OUTPUT phase shift from the PRIMARY OUTPUT less two. As long as this offset value is less than the binary counter state, the shifted sequence is taken directly from the output of mask circuit 30, i.e. SHIFTED OUTPUT equals SHIFTED OUTPUT(1). As soon as the counter state equals the offset value as determined by comparator 52, flip-flop 58 is set, and the following SHIFTED OUTPUT bit is taken from the delayed version of SHIFTED OUTPUT(1) output from flip-flop 40. The process just described inserts a zero in the SHIFTED OUTPUT sequence as compared to the SHIFTED OUTPUT(1) sequence.

The SHIFTED OUTPUT sequence will continue to be taken from the delayed version of the SHIFTED OUTPUT(1) sequence for the period that the counter state is greater than or equal to the offset value. When counter 48 is reset to zero by the process described above the SHIFTED OUTPUT(1) sequence is again provided as the SHIFTED OUTPUT sequence. Since it is at this point where a zero is inserted in the primary sequence, the shifted sequence must revert back to that taken directly from mask circuit 30 to prevent an unwanted extra state inserted in the shifted sequence.

Figure 4:
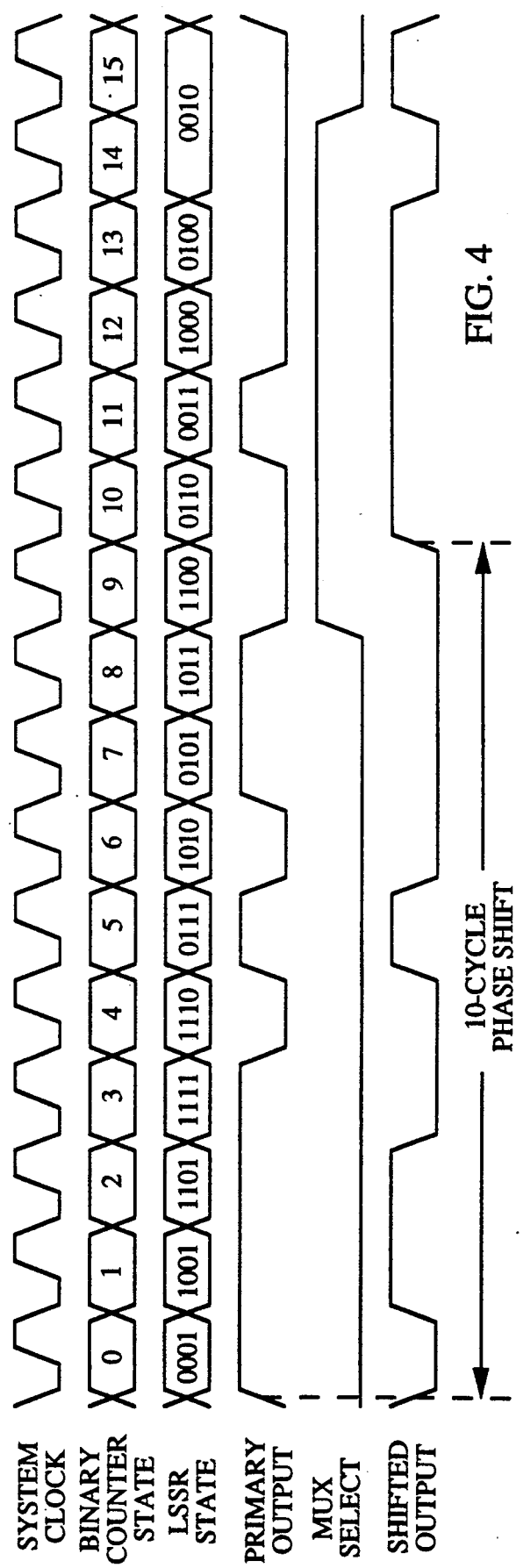
FIG. 4 is a timing diagram for the PN sequence generator of FIG. 2.

For purposes of further explanation, Table I below, in conjunction with the timing diagram of FIG. 4, illustrates an example of a 4-bit PN generator with a SHIFTED OUTPUT sequence that is shifted from the PRIMARY OUTPUT sequence by 10 chips. The polynomial chosen for this example which specifies the PN sequence is:

$$PN_{ex} = x^4 + x^3 + 1. \quad (2)$$

Further in this example the MASK input bus is set equal to 1010 (binary), which causes the shifted sequence to be offset by 10 chips. Consequently, the OFFSET input bus is set to $10 - 2 = 8$ or 1000 (binary).

TABLE I

| BINARY COUNTER STATE | LSSR STATE | PRIMARY OUTPUT | MASK OUTPUT (D) | DELAYED MASK OUTPUT (Q) | SHIFTED OUTPUT |
|---|---|---|---|---|---|
| 0 | 0001 | 1 | 0 | 1 | 0 (D) |
| 1 | 1001 | 1 | 1 | 0 | 1 (D) |
| 2 | 1101 | 1 | 1 | 1 | 1 (D) |
| 3 | 1111 | 1 | 0 | 1 | 0 (D) |
| 4 | 1110 | 0 | 0 | 0 | 0 (D) |
| 5 | 0111 | 1 | 1 | 0 | 1 (D) |
| 6 | 1010 | 0 | 0 | 1 | 0 (D) |
| 7 | 0101 | 1 | 0 | 0 | 0 (D) |
| 8 | 1011 | 1 | 0 | 0 | 0 (D) |
| 9 | 1100 | 0 | 1 | 0 | 0 (Q) |
| 10 | 0110 | 0 | 1 | 1 | 1 (Q) |
| 11 | 0011 | 1 | 1 | 1 | 1 (Q) |
| 12 | 1000 | 0 | 1 | 1 | 1 (Q) |
| 13 | 0100 | 0 | 0 | 1 | 1 (Q) |
| 14 | 0010 | 0 | 1 | 0 | 0 (Q) |
| 15 | 0010 | 0 | 1 | 1 | 1 (D) |

Notice in Table I that the LSSR state "0010" is present for two cycles. The detection of the LSSR state "0100" disables the cycling of the LSSR after the first occurrence of the LSSR state "0010". With the LSSR disabled for one clock cycle the state "0010" is repeated as to cause an extra zero to be inserted in the primary sequence as illustrated in Table I. After the first of these two LSSR "0010" states, the shifted sequence is taken directly from the mask circuit output, which, in effect, "absorbs" the added state. When the binary counter state equals "8," however, as determined by the OFFSET value, it is time to insert a zero in the shifted sequence. This insertion is done by taking the shifted sequence from the delayed mask circuit output from flip-flop 40. Table I illustrates that this process inserts a zero in the shifted sequence at the correct time.

FIG. 4 illustrates a timing diagram which further details the sequencing of the above example. It should be noted that the mapping of the states in Table I are coordinated with those of the timing diagram of FIG. 4. FIG. 4 also shows the MUX SELECT signal, which controls multiplexer 42 which is responsible for determining whether the shifted sequence is taken directly from the mask circuit output (MUX SELECT is low) or the delayed version of it output from flip-flop 40 (MUX SELECT is high). The timing diagram of FIG. 4 also clearly illustrates the 10-cycle phase shift that the SHIFTED OUTPUT experiences.

As illustrated in the circuit diagrams of FIGS. 1-3, the LSSR and binary counter states may be loaded, as controlled by the LOAD ENABLE input. The counter through the LOAD ENABLE input is set to the state corresponding to the value of the COUNTER LOAD STATE input. It should be understood that for each value of the LSSR LOAD STATE there is a corresponding COUNTER LOAD STATE. When the counter state is loaded, the COUNTER LOAD STATE value corresponding to the LSSR LOAD STATE must be provided to ensure that the sequence is correctly produced. Otherwise, an incorrect shifted sequence may result. However, should the counter load state be incorrect the sequence will only be incorrect until an extra state is inserted in the primary sequence. When the extra state is inserted into the primary sequence, the action of AND gate 44 and OR gate 46 causes the counter to be automatically reset to zero. From this point on, the counter 48 will properly track the LSSR state and the SHIFTED OUTPUT sequence will have the proper phase shift.

The use of the loading the LSSR state and the counter state allow the generated sequence to be started anywhere in the sequence. This use of this feature permits the output sequence to be initialized to any position in the entire sequence in a simple manner. Although such a technique may be used to change the sequence, it is much more difficult to compute the state of the LSSR for each desired shift and load into the LSSR than it is to provide a mask which corresponds to each desired shift. Using the technique of loading the LSSR to change the sequence shift would still require an LSSR state or output sequence detection to augment the sequence.

an important feature of the disclosed invention is that when the phase shift is to be changed, the SHIFTED OUTPUT begins producing the new phase as soon as the new values of OFFSET and MASK are updated. In some applications, only a small number of different sequence delays must be produced by the SHIFTED OUTPUT sequence. In such a case, it would be simplest to implement if the paired values of OFFSET and MASK were pre-computed and stored in a Read Only Memory (ROM) not shown. If a large number of different delays are desired, then an associated microcomputer, not shown, could be programmed to produce the paired values of MASK and OFFSET corresponding to the desired delays.

In the exemplary embodiment of the present invention as disclosed herein there are $2^N-1$ shifts from the primary sequence. Thus there exists $2^N-1$ legal mask values with the all zero mask value not being permitted. The all-zero mask value would result in an all-zero output sequence using the disclosed mask circuit. Additionally, since the mask value of all zeros except for a the last mask bit (Bit 0 that is ANDed with $x^N$) results in an unshifted sequence, there exists one other shift that is not available. In the example illustrated a one chip shift in the shifted sequence is not available.

In the general usage of the present invention a one chip shifted sequence is not needed. However logic (not shown) may be readily constructed to provide a one chip shifted sequence where needed. Referring to FIG. 2, in the case of the one chip shifted sequence the MASK value would be set to all zero except for the last bit. Detection logic (not shown) would do an N-bit comparison between the MASK value and an input value of all zeros except for the last bit. Another N-bit comparison would be made between the N-bit OFFSET value and another input value of $2^N-1$. In the situation where the MASK value is equal to all zeros except for the last bit, and the OFFSET value is equal to the value $2^N-1$ $(1-2=2^N-1)$, the shifted sequence output from multiplexer 42 would always be the Q output of flip-flop 40. Logic implementing this feature are a pair of N-bit equal to comparators (not shown) with the outputs thereof coupled through an AND gate (not shown) to one input of an OR gate (not shown). This OR gate would be positioned between AND gate 54 and flip-flop 58, with the other input of the OR gate coupled to the output of AND gate 54 and the output of the OR gate coupled to the D input of flip-flop 58.

It should be understood that many variations to the present invention may be implemented to provide an augmented maximal length sequence generator. However other implementations generally lack the ability to provide fast offset adjustment, i.e. the ability to quickly change the shift in the sequence. For example rather than the state of the LSSR being used for comparison to determine the point of insertion, the primary output (for unshifted sequences) or the mask circuit output (for shifted sequences) may be used. The sequence of single bits may be stored in an additional shift register or other storage medium for comparison with the desired state for the insertion of the extra chip in the sequence. Upon detection of the appropriate bit sequence, the LSSR would then be inhibited as before for one chip time to provide the additional chip in the sequence. Using the above teachings, an additional bit or bits may be inserted into the sequence at the desired location.

Figure 5:
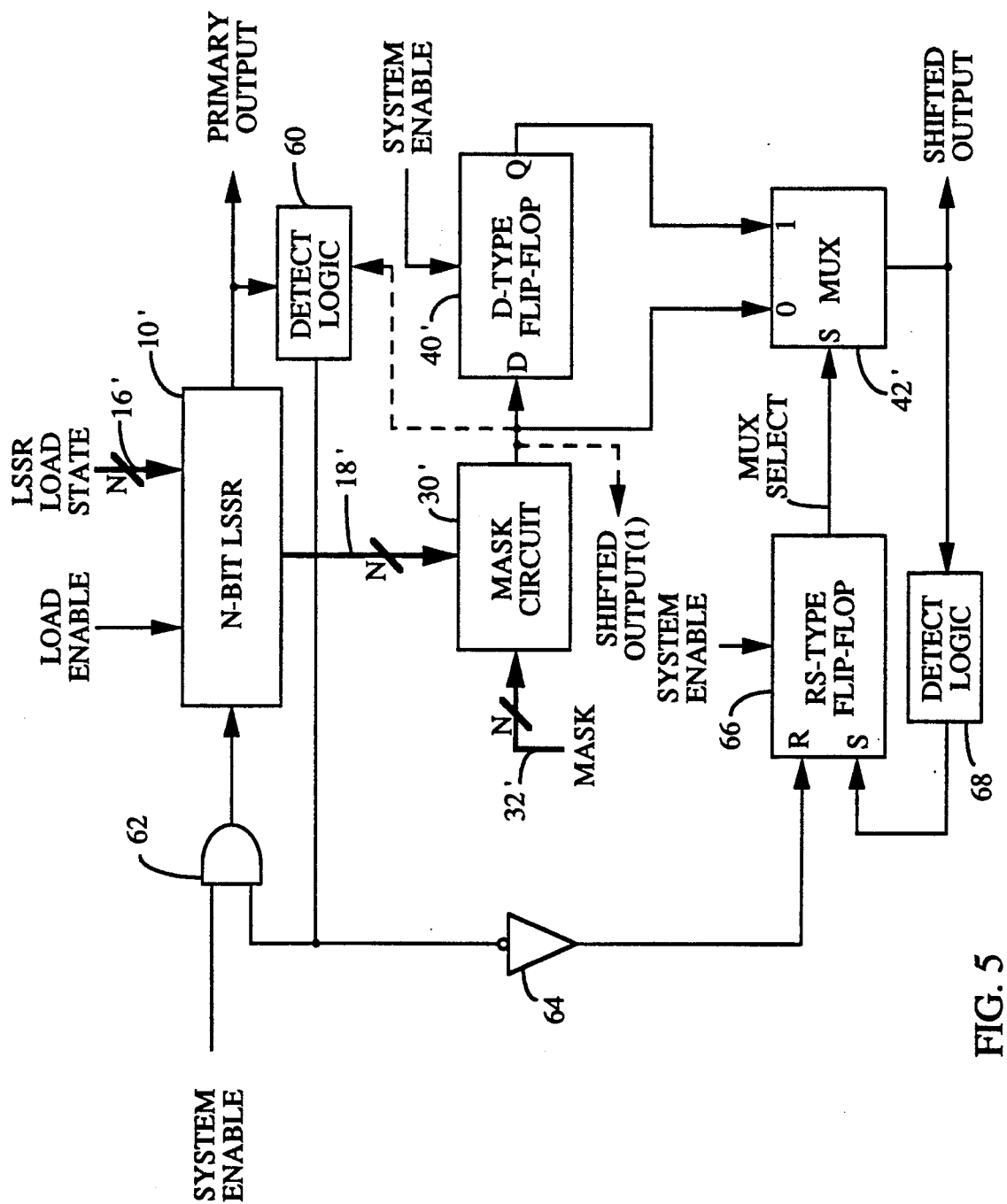
FIG. 5 is an exemplary circuit diagram of alternative PN sequence generator of the present invention.

FIG. 5 illustrates an alternative implementation of an augmented PN sequence generator. LSSR 10' with the loaded state generates the PN sequence of length $2^N-1$ upon the clocking thereof. The sequence is output from LSSR 10' where detect logic 60 detects the condition of N−1 zeros in a row for the exemplary insertion point of an additional chip. When this condition is detected a signal is generated which is output to AND gate 62 and ANDed with the SYSTEM ENABLE signal so as to disable LSSR 10' for one clock cycle. Thus the PRIMARY OUTPUT sequence is now of length $2^N$.

In order to provide a shift in sequence LSSR 10' may be loaded with the appropriate state. However for the reasons discussed above such a technique is not as preferable as using the state output of LSSR and mask circuit 30'. The output of mask circuit 30' is again coupled to the D input of D-type flip-flop 40' and also to one data input of multiplexer 42'. The Q output of flip-flop 40' is coupled to the other data input of multiplexer 42' with the output thereof providing the shifted sequence.

The output of detect logic 60 is also provided through inverter 64 to the reset (R) input of RS-type flip-flop 66. The set (S) input of flip-flop 66 is coupled to the output of detect logic 68 with the input of thereof coupled to the output of multiplexer 42'. The output of flip-flop 66 is coupled to the select input of multiplexer 42'. Detect logic 68 is used again to detect the condition of N−1 zeros in a row in the shifted sequence.

Since the sequence provided through mask circuit 30' is shifted from that of the primary output of the LSSR, when the LSSR is inhibited for one clock cycle to insert the extra state in the primary sequence it is not the correct position to insert the extra state in the shifted sequence. The signal from detect logic 60 through inverter 64 and flip-flop 66 is used to absorb the extra state when inserted in the primary sequence. Thus when flip-flop 66 is reset by this signal the output thereof is used to select as the output from multiplexer 42' the SHIFTED OUTPUT(1) output directly from mask circuit 30'. The signal from detect logic 68 through flip-flop 66 is used to insert the extra state in the SHIFTED OUTPUT sequence. When flip-flop 66 is set by the signal from detect logic 68, the output thereof is used to select as the output from multiplexer 42' the delayed version of SHIFTED OUTPUT(1) sequence output from flip-flop 40'.

Detect logic 60 and 68 may be constructed by simply using a shift register with N−1 taps with the taps coupled as inputs to an OR gate. In the alternative a $\log_2(N-1)$ counter may be used to detect the sequence of N−1 zeros. It should be noted that in the alternative implementation of FIG. 5, when the input mask changes the shifted output may not be correct for up to N−1 cycles.

In variant of the implementation of FIG. 5 the shifted sequence output from mask circuit 30', the sequence SHIFTED OUTPUT(1), may be directly output (via the dashed lines) as the output shifted augmented PN sequence. In this case the output of mask circuit 30' is provided to detect logic 60 (via dashed lines). Again detect logic 60 is used to detect the sequence of N−1 zeros and inhibit the change in state of LSSR 10'. However, since the SHIFTED OUTPUT(1) sequence is detected to inhibit the LSSR, the insertion of the extra state in the sequence is correct for SHIFTED OUTPUT(1) sequence but not for the PRIMARY OUTPUT sequence.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A pseudorandom noise (PN) sequence generator comprising:

means for generating a PN sequence of length $2^N-1$ chips; and means, operatively connected to said means for generating, for inserting at least one additional chip in said PN sequence, with said means for generating providing an output augmented PN sequence of a length of at least $2^N$ chips;

wherein N is a positive, non-zero integer;

wherein said means for generating is of a respective state for each chip generated in said PN sequence; and wherein said means for inserting comprises:
    means for detecting a predetermined state of said means for generating; and
    means for inhibiting a change in state of said means for generating upon detection of said predetermined state.

2. A pseudorandom noise (PN) sequence generator comprising:

means for generating a PN sequence of length $2^N-1$ chips; and means, operatively coupled to said means for generating, for inserting at least one additional chip in said PN sequence, with said means for generating providing an output augmented PN sequence of a length of at least $2^N$ chips;

wherein N is a positive, non-zero integer; and, wherein said means for inserting comprises:
    means for detecting a predetermined portion of said PN sequence of length $2^N-1$ chips; and
    means for inhibiting a change in said means for generating upon detection of said predetermined portion of said PN sequence.

3. A pseudorandom noise (PN) sequence generator comprising:

means for generating a PN sequence of length $2^N-1$ chips;

means, operatively coupled to said means for generating, for inserting at least one additional chip in said PN sequence, with said means for generating providing an output augmented PN sequence of a length of at least $2^N$ chips; and means, operatively coupled to said means for generating, responsive to a shift input for providing a predetermined shift in said output augmented PN sequence;

wherein N is a positive, non-zero integer.

4. The generator of claim 1 further comprising;

means, operatively coupled to said means for generating, responsive to a shift input for providing a predetermined shift in said PN sequence;

means for receiving said shifted PN sequence and providing a delayed shifted PN sequence which is delayed by one chip from said shifted PN sequence; and means, operatively coupled to said means for inhibiting, and for receiving said shifted PN sequence and said delayed shifted PN sequence, for receiving an offset input and responsive thereto for providing an output of a selected one of said shifted PN sequence and said delayed shifted PN sequence.

5. In a pseudorandom noise (PN) sequence generator capable of generating a PN sequence of a sequence length of $2^N-1$ chips, in which N is a positive, non-zero integer, said generator using a linear sequence shift register (LSSR) clocked at a predetermined clock rate by an external clock, said LSSR having a plurality of register stages collectively providing upon each clocking of said LSSR an output corresponding to the state of said LSSR, said LSSR responsive to a disabling input for disabling the generation of said PN sequence, a circuit for augmenting the length of said PN sequence output from said LSSR to a sequence length of $2^N$ chips comprising:

comparison means for receiving said LSSR state output and a comparison state input representative of a predetermined LSSR state, for comparing said LSSR and comparison states, and providing a corresponding match indication; and logic means for receiving said match indication and for providing said disabling input to said LSSR at a predetermined time for one clock cycle upon occurrence of said match indication representative of an equality in said LSSR and comparison states.

6. The PN generator of claim 5 further comprising shift means for receiving said LSSR state output and a mask input for providing a sequence shifted version of said LSSR augmented length PN sequence.

7. The PN generator of claim 6 wherein said shift means further comprises:

mask means for, receiving said LSSR output state and said mask input, for generating a modified shifted version of said LSSR augmented length PN sequence;

adjustment means for receiving said modified shifted version of said LSSR augmented length PN sequence, receiving an offset input, delaying said modified shifted version of said LSSR augmented length PN sequence and for providing a selected one of said modified shifted version of said LSSR augmented length PN sequence and said delayed modified shifted version of said LSSR augmented length PN sequence so as to provide an output of a shifted version of said LSSR augmented length PN sequence.

8. In a pseudorandom noise (PN) sequence generator capable of generating a PN sequence of a sequence length of $2^N-1$ chips, in which N is a positive, non-zero integer, said generator using a linear sequence shift register (LSSR) clocked at a predetermined clock rate by an external clock, said LSSR having a plurality of register stages each having an output for collectively providing thereat upon each clocking of said LSSR an output bit corresponding to the state of said LSSR, said LSSR having an enable input for enabling/disabling the generation of said PN sequence for each clock cycle, a circuit for augmenting the length of said PN sequence output from said LSSR to a sequence length of $2^N$ chips comprising;

a first N-bit comparator having a first set of N inputs each coupled to a respective stage output of said LSSR, another set of N inputs each for receiving a predetermined state input bit and an output;

a first clocked delay register having a data input coupled to said comparator output, and an output;

a second clocked delay register having a data input coupled to said first clocked delay register output, and an output;

a first logic circuit having a pair of inputs respectively coupled to said first and second delay register outputs and an output coupled to said LSSR enable input, said first logic circuit generating a signal for enabling and disabling said LSSR for one clock cycle.

9. The PN generator of claim 8 further comprising:

a mask circuit having a plurality of state inputs each coupled to a respective one of said LSSR register stage outputs, a plurality of mask inputs each for receiving a predetermined bit of an N-bit input mask, and an output;

a third clocked delay register having a data input coupled to said mask circuit output, and an output;

a multiplexer having a pair of data inputs respectively coupled to said mask circuit output and said second clocked delay register output, a select input, and an output; and a selector circuit having a first and second inputs respectively coupled to said first and second delay register outputs, a third input for receiving said system enable signal, an offset input for receiving an external offset signal for generating and providing a select signal at an output coupled to said multiplexer select input.

10. The PN generator of claim 9 wherein said selector circuit comprises:

an N-bit clocked counter having a reset input and N outputs;

a reset logic circuit having first and second inputs, coupled to said first and second delay register outputs, and an output coupled to said counter reset input;

a second N-bit comparator having a first set of N inputs each coupled to a respective one of said counter N outputs, another set of N inputs each for receiving a predetermined bit of an N-bit offset, where said offset is of a value different from a value of said N-bit mask by a predetermined value;

a second logic circuit having a pair of inputs respectively coupled to said first delay register output and said second comparator and an output, said second logic circuit generating said select signal; and a fourth clocked delay register having a data input coupled to said second logic circuit output, and an output coupled to said multiplexer select input.

11. The PN generator of claim 8 wherein said first logic circuit comprises:

an inverter having an input coupled to said first register output, and an output;

a NAND gate having one input coupled to said inverter output and another input coupled to said first comparator output, and an output;

an AND gate having one input coupled to said NAND gate output and another input for receiving said system enable signal and an output coupled to said LSSR enable input.

12. The PN generator of claim 10 wherein each of said first, second, third and fourth delay registers has an enable input for receiving a system enable signal.

13. The PN generator of claim 10 wherein:

said counter has an N-bit load input for receiving a counter load state value; and said reset logic circuit comprises:

a first AND gate having a first and second inputs respectively coupled to said first and second delay register outputs and a third input for receiving a system enable signal;

an OR gate having a first input coupled to said AND gate output and a second input for receiving a load enable signal, said OR gate having an output coupled to said counter reset input.

14. The PN generator of claim 10 wherein said second logic circuit comprises:

an inverter having an input coupled to said first delay register output, and an output; and an AND gate having one input coupled to said inverter output and another input coupled to said second comparator output, and an output coupled to said fourth delay register input.

15. The PN generator of claim 13 wherein said second logic circuit comprises:

an inverter having an input coupled to said first delay register output, and an output; and a second AND gate having one input coupled to said inverter output and another input coupled to said second comparator output, and an output coupled to said fourth delay register input.

16. A method of generating a psuedorandom noise (PN) sequence of a sequence length of $2^N$ chips, in which N is a positive, non-zero integer, the method comprising the steps of:

generating a PN sequence of length $2^N-1$ chips;

inserting in at least one predetermined position in said PN sequence at least one additional chip so as to provide an output augmented PN sequence of at least $2^N$ chips;

wherein said PN sequence is generated by a PN generator which is of a respective state for each chip generated in said PN sequence; and, wherein said step of inserting comprises the steps of:

detecting a predetermined state in said generation of said PN sequence; and inhibiting a change in said state of generation of said PN sequence upon detection of said predetermined state.

17. A method of generating pseudorandom noise (PN) of a sequence length of $2^N$ chips, in which N is a positive, non-zero integer, the method comprising the steps of:

generating a PN sequence of length $2^N-1$ chips;

inserting in at least one predetermined position in said PN sequence at least one additional chip so as to provide an output augmented PN sequence of a length at least $2^N$ chips; and, wherein said step of inserting comprises the steps of:

detecting a predetermined portion of said PN sequence of length $2^N-1$ chips; and inhibiting said generation of said PN sequence upon detection of said predetermined portion of said PN sequence.

18. A method of generating a pseudorandom noise (PN) sequence of a sequence length of $2^N$ chips, in which N is a positive, non-zero integer, the method comprising the steps of:

generating a PN sequence of length $2^N-1$ chips;

inserting in at least one predetermined position in said PN sequence at least one additional chip so as to provide an output augmented PN sequence of a length at least $2^N$ chips; and, providing a predetermined shift in said output augmented PN sequence.

* * * * *